United States Patent

[11] 3,619,511

[72] Inventor Ken Y. Ishikawa
Bellflower, Calif.
[21] Appl. No. 842,502
[22] Filed July 17, 1969
[45] Patented Nov. 9, 1971
[73] Assignee North American Rockwell Corporation

[54] DATA NORMALIZING APPARATUS
10 Claims, 11 Drawing Figs.

[52] U.S. Cl. .......... 179/15 AD, 179/15 A, 179/15 AV
[51] Int. Cl. .......... H04j 3/04
[50] Field of Search .......... 179/15 BL, 15 BM, 15 BP, 15 AP, 15 AV, 15 A, 15 AD, 15 AZ; 307/264, 235; 325/42, 62, 187

[56] References Cited

UNITED STATES PATENTS

| | | | |
|---|---|---|---|
| 2,782,258 | 2/1957 | Stalemark | 179/15 (BP) |
| 2,795,650 | 6/1957 | Levine | 179/15 (AV) |
| 3,180,939 | 4/1965 | Hall | 179/15 (AP) |
| 3,206,689 | 9/1965 | Santana | 307/264 |
| 3,377,559 | 4/1968 | Steward | 325/62 |
| 3,499,994 | 3/1970 | Lord | 179/15 (BP) |
| 3,500,028 | 3/1970 | Killian | 307/235 |

*Primary Examiner*—Kathleen H. Claffy
*Assistant Examiner*—David L. Stewart
*Attorneys*—William R. Lane, Allan Rothenberg and Sidney Magnes

ABSTRACT: There is disclosed an electronic circuit for operating upon a number of input signals that may be subject to widely varying magnitudes, to provide an optimum magnitude of all of the signals and at the same time retain the relative signal values and an indication of the absolute signal value. A number of input signals are passed through a multiplexor and thence through a gain control amplifier of which the gain is controlled by the maximum signal identified by a peak detector. After normalizing, the signals are fed through a decoder of demultiplexor together with a reference level signal that identifies the absolute value of signals passed through the gain control amplifier. Provision is made for coding the reference level signal to indicate the absolute magnitude of the reference level signal and provision is also made to ensure that the reference level signal does not modify the operation of the peak detector.

INVENTOR.
KEN Y. ISHIKAWA
BY
Allan Rothenberg

INVENTOR.
KEN Y. ISHIKAWA
BY
Allan Rothenberg

INVENTOR.
KEN Y. ISHIKAWA

BY

INVENTOR.
KEN Y. ISHIKAWA
BY
[signature]

DATA NORMALIZING APPARATUS

BACKGROUND

Although the invention disclosed herein is of broad application in a variety of data processing systems, wherever a number of signals of widely varying range are to be handled or transmitted, it has been specifically incorporated in a spectrum analyzer of the type more particularly described and claimed in a copending application of C. R. Johnson and K. Y. Ishikawa for SPECTRUM ANALYZER filed on July 17, 1969, Ser. No. 842,503, and assigned to the Assignee of the instant application.

Signal normalizing amplifiers have been used to compress or expand values of signals where they may be subject to a wide dynamic range. For a large possible range of signal variation in the past, such normalization has been under manual control of an operator who visually observes signal level. In some arrangements a number of cascaded amplifiers have been employed, each of which has two levels of gain control. Mechanical arrangements have been suggested with concomitant lack of speed and precision. Where automatic equipment is required and a large number of signals are to be handled, plural amplifier gain control stages that have been provided for each of the signals to be handled result in complex equipment and such systems suffer particularly from the disadvantage of matching or tracking gain control of the various amplification stages. Accordingly it is an object of the invention to provide an improved electronic signal normalizing system that employs a minimum of equipment and provides maximum precision and tracking accuracy.

SUMMARY

In carrying out the principles of this invention in accordance with a preferred embodiment thereof, there is provided a data handling system for effecting normalization of a number of signals of widely variable range, including a multiplexer that samples signals and a single gain control amplifier for normalizing the signals and operating upon the sampled input signals to provide signals of optimum magnitude. Sequences or groups of signals from the gain control amplifier are analyzed and the maximum value of the signal in any given sequence or group is determined. Based upon such identified maximum value the gain of the gain control amplifier is modified to cause the maximum signals of any sequence or group to approach but remain less than a predetermined selected maximum magnitude. The normalized signals are then fed through a decoder or demultiplexer which is synchronized with the input multiplexer whereby the original input signals are readily available in normalized form. Suitable means is provided to identify the amount of normalization provided. In a preferred arrangement the normalization range identifying means comprises apparatus for generating a reference level signal having one of a number of selected ranges with a preselected known magnitude of reference signal in each range. The range or reference level chosen is selected in accordance with the level of the maximum peak detected at a particular instant and such reference level signal may be appropriately coded to indicate the particular range which it represents. For convenience of the data handling and processing operations, the coded reference level signal is fed through the data decoder or demultiplexer together with the information signals.

Objects and many attendant advantages of the invention may be more readily appreciated as the same becomes better understood by reference to the following detailed description when considered in connection with the accompanying drawing wherein:

FIG. 1 comprises a block diagram of a data normalizing system of a preferred form of the invention;

FIGS. 2*a* through 2*d* illustrate certain pulses of interest in explaining the operation of the invention;

FIGS. 3*a* and 3*b* together comprise a detailed circuit diagram of the preferred embodiment of the invention;

Figure 7:
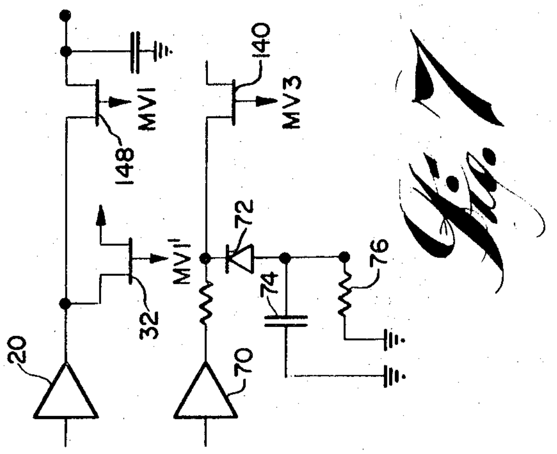
Figure 6:
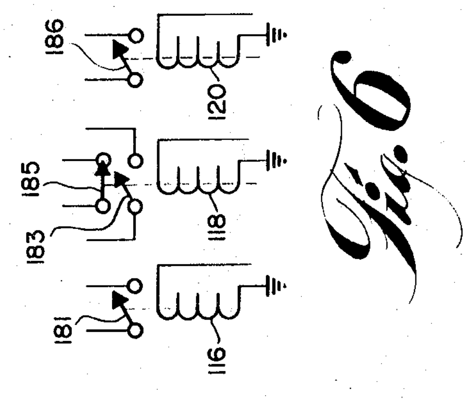
Figure 5:
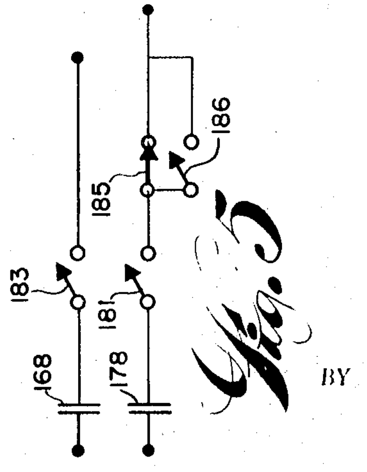
FIG. 5 illustrates a switching arrangement for changing the time constant of two of the stages of the multiplexer driver.

FIG. 6 shows the arrangement of inductances that operate the relay contacts of FIG. 5; and FIG. 7 illustrates portions of the invention as modified for particular application to the spectrum analyzer of the above identified copending application of C. R. Johnson and K. Y. Ishikawa for SPECTRUM ANALYZER.

Throughout the drawings like reference numerals refer to like parts.

Figure 1:
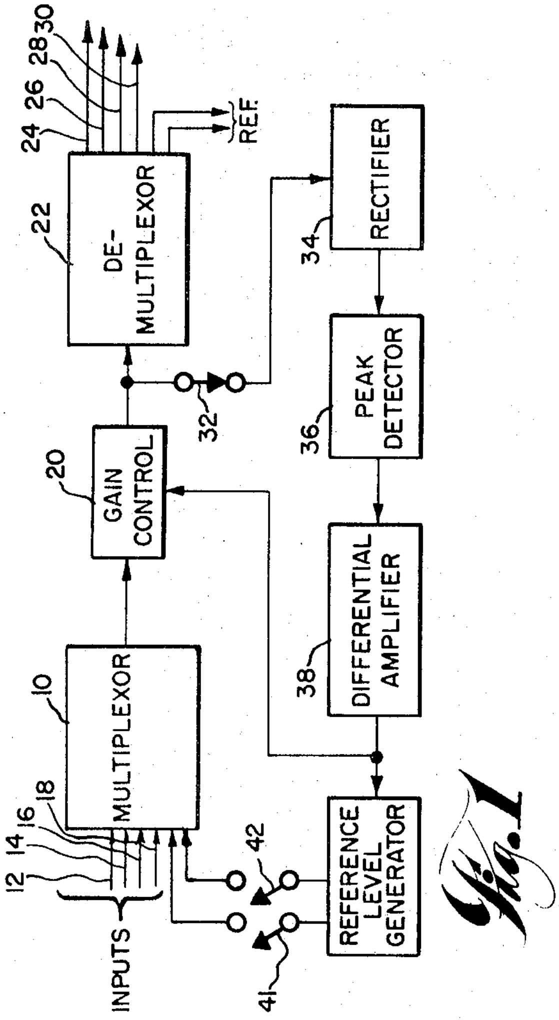

Referring now to FIG. 1, a recycling multiplexer 10 is adapted to receive a number of inputs 12, 14, 16 and 18 having a wide range of variation which may, for example, be from 0 to 80 decibels. Although these inputs may take any of a number of widely varying forms, in a particular embodiment wherein the data normalizer of this invention is employed as a part of a spectrum analyzer, the several inputs each comprises a sinusoidally varying signal having a frequency in the range of from 0.1 Hertz to 0.8 Hertz. Signals of this type are found, for example, in sensors employed for detection of variations of the earth's magnetic field or electrical potential waves in the earth. It will be readily apparent that the number of inputs, four as illustrated in FIG. 1, is exemplary only, and a larger or smaller number of inputs can be employed in the systems to be described herein.

As is well known the output of the multiplexer provides each of the input signals in sequence on a signal line and these sequential or multiplexed input signals are fed to a gain control circuit 20 from whence the output is fed to a decoder or demultiplexer 22 which provides on lines 24, 26, 28 and 30, the outputs of the system in the form of normalized versions of inputs 12 through 18 inclusive. These normalized versions of the signal provided at the output of demultiplexer 22 retain their relative magnitudes but are provided with a maximum magnitude that is substantially equal to but somewhat less than a predetermined full scale magnitude which may be chosen in order to meet requirements of subsequent signal processing equipment, an example of which is shown in the aforesaid copending patent application for SPECTRUM ANALYZER.

For purposes of controlling the gain control circuit 20, the train of pulses passed through the gain control amplifier are passed through a peak detector that has, in effect, a time window on the order of 5 seconds in width that slides or moves along in time with the movement of the train of pulses. Thus where the multiplexer sampling interval is on the order of 2 milliseconds, so that the train of pulses passed through the gain control amplifier comprises a series of pulses of 2 millisecond duration, the peak detector time window will accept about 2500 pulses, each of a weight that decreases with time. The peak detector, which includes a capacitor, will be more particularly described in connection with FIG. 3*a* and 3*b*. It is arranged to accept additional pulses only when such pulses exceed the charge stored on the capacitor so that the peak detector provides a signal which at all times is representative of the maximum value of pulses received within the immediately previous 5 seconds.

The train of pulses is fed from the gain control amplifier 20 via a normally closed switch 32 to a rectifier 34 which provides full wave rectification of the pulse train. Thus all negative pulses, for example, are passed through the rectifier unchanged and all positive going pulses are inverted and then passed from the rectifier to the peak detector 36. The output of the peak detector, comprising a signal representing maximum value of the largest peak detected in the most recent series or group of pulses, is fed to a differential amplifier 38 which compares the maximum peak signal with a predetermined reference and provides to the gain control circuit 20 a gain control signal representing the value of the detected peak with respect to the reference. Thus it will be seen that the gain control circuit 20 is continuously adjusted in accordance with the maximum pulse of the most recent of a group of consecutive pulses and all signals passing from the multiplexer to the demultiplexer are normalized by the adjusted gain circuit 20.

Figure 2:
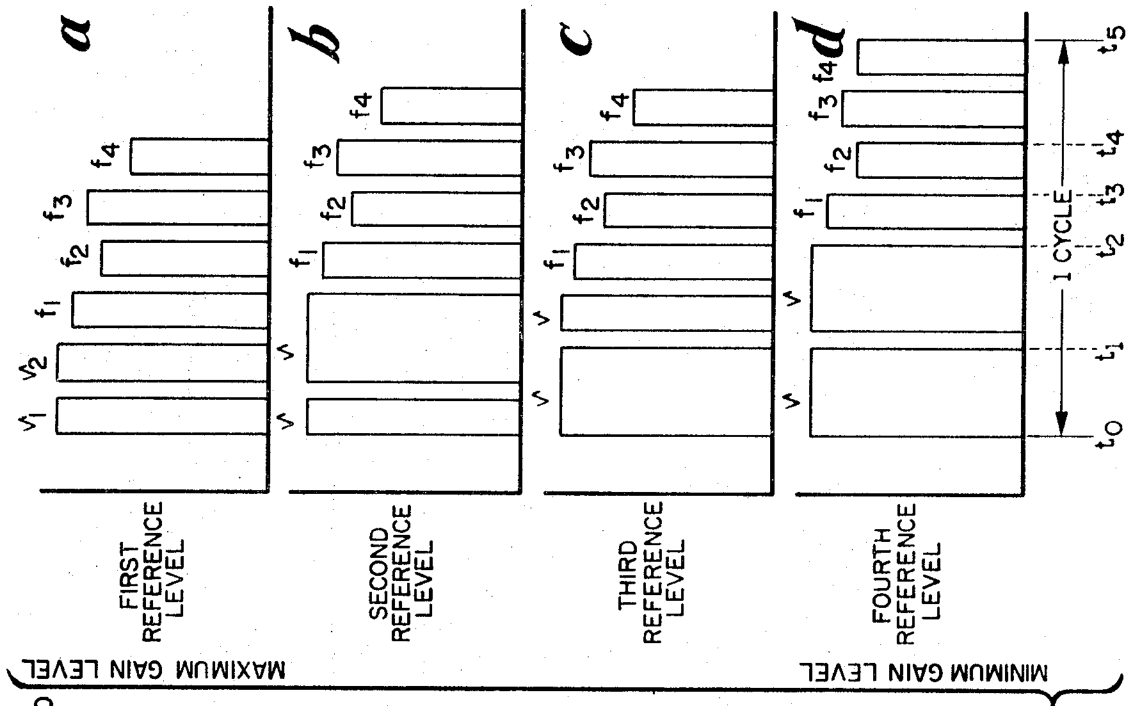

As illustrated in FIG. 2*a*, for example, a series of input signals to the multiplexer appears at the multiplexer output as a group of relatively narrow pulses $f_1$, $f_2$, $f_3$, and $f_4$. In one possible situation each of these pulses at the multiplexer input may be of relatively small magnitude whereby the peak detector will provide for maximum gain and each of the signals will be amplified to a maximum extent. Thus the maximum signal in this example, $f_1$, is provided with a gain sufficient to enable it to reach the indicated level and each of the other signals is proportionately amplified. Where a group of signals includes a signal of larger magnitude than the previously detected peak, the gain of the gain control circuit 20 is decreased and the amount of amplification is less than that in the first exemplary situation. Nevertheless, in such an arrangement the group of pulses will have the maximum pulse thereof again provided with an amplification that enables it to attain full scale or almost full scale and each of the other pulses $f_2$, $f_3$ and $f_4$ will be again amplified in proportion to the amplification of the maximum pulse $f_1$.

In order to provide an indication of the amount of normalization provided by the gain control circuit 20, the error signal at the output of the differential amplifier 38 is also fed to a reference level generator 40 which in effect has four ranges of amplitude levels and accordingly provides to the multiplexer via normally open switches 41 and 42 (when the latter are closed) reference level pulses having an absolute amplitude indicative of a selected one of the four reference level ranges. Thus, for example, when maximum gain control is indicated by the output of the differential amplifier, the reference level pulses provided via switches 41 and 42 as an additional input to the multiplexer 10 have a minimum value. When minimum gain control is indicated by the differential amplifier, that is when the maximum peak is detected by the peak detector, a maximum level of reference level signal is provided by the reference level generator. So, too, for a second and third intermediate reference level signal as will be more particularly described in connection with FIGS. 3*a* and 3*b*.

The reference level signals provided via switches 41 and 42 are normally of a value substantially equal to the maximum value of the input signal provided on lines 12 through 18 of the multiplexer input for each of the several reference level or gain ranges. For this reason the reference level signals cannot be provided to the peak detector although they are passed through the gain control amplifier and thus is normalized. Accordingly switches 41, 42 and 32, normally open, open, and closed respectively, are ganged for simultaneous operation so that when the reference level signals are fed to the multiplexer input, the switch 32 is open and the output of gain control amplifier is not fed to the rectifier and peak detector but is fed only to the demultiplexer. When the switches 32, 41 and 42 are in the positions illustrated in FIG. 1, the reference level signal is not effective, but the input signals on lines 12 through 18 are passed both to the demultiplexer and through the peak detector gain control circuit.

As illustrated in FIG. 2*d* the multiplexer, for an on-time for each input channel of 2 milliseconds will have a total cycling time of 16 milliseconds. This 16 millisecond interval accounts for the exemplary four input signals having a switching time of 2 milliseconds each and two reference level pulses each of a maximum possible duration of 4 milliseconds. These reference level pulses $r_1$ and $r_2$ of FIG. 2*d* have durations coded to represent one of the four chosen reference level magnitudes. Thus, as illustrated in FIG. 2*a*, for maximum gain, for example, the reference signals $r_1$ and $r_2$ each has a 2 millisecond duration. Each is a narrow pulse of substantially the same width as the information pulses $f_1$ through $f_4$. In such a situation the multiplexer will have a dead time in which no signal is transmitted, substantially equal to 4 milliseconds or the width of two halves of the maximum reference pulse width that are not used in this range. For the second reference level, the second highest gain condition, the first reference pulse $r_1$ retains its narrow 2 millisecond width and the width of the second reference pulse $r_2$ is doubled. As indicated in FIG. 2*c* the third highest reference level condition is indicated by increased or doubled width of $r_1$ and narrow width of $r_2$ and, as indicated previously, the minimum gain condition is indicated by double width of both $r_1$ and $r_2$.

Suitable provision may be made for additionally coding the end of each multiplexer cycle so as to enable identification of the reference pulses should they have the same width as each of the information pulses. Such an indication may be provided in the form of the width of these pulses $r_1$ and $r_2$ which would be, for example, 3 milliseconds and 6 milliseconds for the narrow and wide condition respectively to thus distinguish from the 2 millisecond information pulse. In such arrangement the multiplexer total cycling time would be changed accordingly.

The reference level pulses fed through the multiplexer and gain control circuit 20 are also fed through the demultiplexer 22 to appear at the output thereof in parallel with the other normalized signals on lines 24, 26, 28, 30.

Referring now to the detailed circuit diagram of FIG. 3, the multiplexer comprises a plurality of switches 44, 46, 48, 50, and also includes switches 42 and 41, all of which are illustrated as formed by field effect transistors having drain electrodes adapted to be connected, for the input switches, with the input signals $f_1$, $f_2$, $f_3$, and $f_4$ and source electrodes connected in common via resistors 52, 54 and 56 and capacitor 58 to the input of the gain control amplifier 20 which has a DC balance adjustment network 60 connected to a variable potential source as illustrated.

For recycling the multiplexer switches 41 through 50 there is provided a chain of multivibrators $MV_1$ through $MV_6$. Each of multivibrators $MV_1$ through $MV_6$ is substantially identical to the others except as described hereinafter and each comprises a conventional monostable multivibrator which is connected to trigger the succeeding stage of the chain when it returns to its stable state. A suitable external trigger (not shown) initiates operation of $MV_1$ at the multiplexer recycling rate. If an external trigger is not desired, the first multivibrator $MV_1$ may be modified to be astable or free running, having a period that determines the multiplexer cycle. That is, $MV_1$ changes back to its initial state once for each full cycle of the multiplexer. It will be readily apparent that the particular arrangement of multivibrator timing chain illustrated is but one of many methods for providing sequential operation of the sampling switches 41 through 50 of a multiplexer and many other recycling counters or other periodically triggered chains of switching devices may be employed as is well known to those skilled in the art.

As output of each multivibrator is connected as illustrated to an individual one of the gating electrodes of the field effect transistors 41 through 50, whereby these will be operated in sequence. First, transistor 41 is caused to conduct (turned on) while all transistors of the multiplexer are nonconducting, then transistor 41 is turned off and 42 is uniquely turned on. Similarly 44 is next uniquely turned on while all others remain off and then 46, 48 and 50 are uniquely on in sequence. Each of transistors 44, 46, 48 and 50 is on for a 2 millisecond interval as previously explained, this interval being chosen by the timing of the individual multivibrator controlling the gate electrode. In the arrangement illustrated and for the purpose of enabling the appropriate time for the coding of the reference signal, transistors 41 and 42 are uniquely turned on for different periods of time as will be more particularly explained in connection with the demultiplexer illustrated in FIG. 3*b*.

The signals at the output of the gain control amplifier 20 are fed via the normally closed (conducting) switch 32, shown here as formed of a field effect transistor, and lead 33 to the rectifier 34 comprising an amplifier 64 having its output connected to a pair of oppositely poled diodes 66 and 68 each of which is connected in a feedback arrangement to the input of amplifier 64. The output of the rectifier is connected through a stage of amplification 70 to the peak detector which is comprised of a diode 72 and a capacitance-resistance integrating circuit 74, 76. As previously described the circuit constants of the peak detector are chosen to provide a 5 second sliding time window in the embodiment herein disclosed for purposes of exposition. The full wave rectified pulses, all negative, are fed through the diode 72, poled as indicated, whenever the pulse is greater than the negative charge stored on the capacitor 74. The charges on the capacitor will leak off via the capacitor discharge circuit through resistor 76 at a selected rate whereby the peak detector in effect gives the greatest weighting to the most recently received maximum pulse. Accordingly it will be seen that if, after receiving a large pulse the subsequent pulses are of lesser magnitude, the value of the signals stored on the capacitor 74 will not be further augmented and will decrease. The peak level indicated at that time thus will become of lesser value.

The peak signal is fed through a stage of amplification 78 and thence as a first input to a comparator amplifier 80 which has a second input from a source of negative voltage via a pair of adjustment and calibration resistors 82, 84.

The output of comparator 80 is fed via a negatively poled diode 86 to a point 88 on which a voltage bias is established by means of a voltage divider network 90, 92 connected between a source of negative voltage and ground. The signal at point 88 comprises the error signal which is fed via lead 95 to the reference level generator. This error signal is also fed via lead 95, 97 to a pair of transistors 94, 96 connected between ground and the input of the gain control amplifier 20.

The reference level generator comprises three comparator amplifiers 98, 100 and 102, each having an input in common from the error signal at point 88 and each having a second input of mutually different levels from a negative voltage source via potentiometers 104, 106 and 108 respectively. The outputs of the comparator amplifiers of the reference level generators are fed via diodes 110, 112 and 114 respectively to relay coils 116, 118 and 120 respectively, each of which is connected to operate an associated relay switch 122, 124 and 126 respectively. When the switches are closed a positive potential of a magnitude unique for each switch is connected to the input of amplifier 128 via resistors 130, 132 and 134 respectively. Amplifier 128 also has a normal constant input from a voltage divider 136, 138 and provides an output to the source electrode of the field effect transistors 41 and 42.

For a small value of the peak signal detected by the peak detector 72, 74, 76 the output of comparator 80 that is passed to the diode 86 is at its greatest negative value. In such a case the voltage at point 88 is also at its greatest negative value. This maximum negative voltage at point 88 represents the smallest value of detected peak signal and is fed via lines 95, 97 to the gate electrodes of both of the shunting field effect transistors 94, 96. These transistors as illustrated are of the type that conduct in a decreasing amount with an increasing magnitude of negative signal to their gate electrodes and vice versa. Accordingly with the smallest magnitude of negative signal provided by the quiescent condition at point 88, the shunting transistors 94, 96 conduct greatest and the gain of the amplifier 20 is at its predetermined minimum value. Although the amplifier 20, per se, need not be of variable gain when considered with the variable shunting impedances of transistors 94, 96, the circuit is, in effect, a gain controlling circuit.

When a signal of a greater level is detected by the peak detector, the output of amplifier 80 decreases in negative magnitude and is passed through the diode 86 and the negative potential at point 88 is thereby decreased in magnitude. This decrease of signal level is provided to the gate electrodes of the transistors 94, 96 which accordingly increase in conduction to thereby decrease the gain of the gain control amplifier. For maximum detected signal the output of differential amplifier 80 will go positive, reverse biasing diode 86. In this case the voltage at point 88 is maintained at a slightly negative value by voltage diodes 90, 92 in order to protect transistors 94, 96.

The reference level amplifiers are each arranged to have a reference input from the negative voltage source via its individual potentiometer and will provide an output only when its second input is greater than its reference input. Of the three signals provided by potentiometers 104, 106 and 108, that provided by 104 is smallest (absolute magnitude) and that of 106 is somewhat greater and that provided by 108 has the largest absolute magnitude. The smallest signal, that provided by potentiometer 104, is of a value substantially equal to the signal provided by the quiescent level of voltage at point 88 whereby with such quiescent value, there is no output from any of the amplifiers 98, 100 and 102. In such a situation, the input to amplifier 128 is that provided by the quiescent condition of the amplifier input as controlled by voltage divider 136, 138. When the error signal at point 88 rises to a point where there is an output provided by reference level differential amplifier 98, a signal is transmitted through diode 110 to energize coil 116 and thereby close relay contact 122 to provide an additional voltage via resistor 130 to the input of amplifier 128. In such a situation the reference level signal provided via one of switches 41 or 42 is of a second and higher level (absolute) than the first one which occurs during quiescent level of the signal at point 88. Upon further increase of the level of signal at point 88, when a greater level of peak is detected, the error signal is sufficient to provide an output from both amplifier 100 and amplifier 98. The output from amplifier 100 is fed via the diode 112 to energize relay coil 118 to effect closing of switch 124 and to provide a second increase of voltage level at the input of amplifier 128 and thus to provide a third level of known value of reference signal via switch 41 or 42. For a still further increase of the error signal at point 88, the third amplifier 102 is caused to provide an output which is passed via diode 114 to energize relay coil 120 and close switch 126 to provide via resistor 134 a still higher level of signal at the output of amplifier 128. In this situation, the fourth and highest absolute magnitude of reference level signal is fed through the switch 41 or 42. As will be more particularly described below, the outputs of the reference level amplifiers and, accordingly the condition of the relay coils, collectively comprise a range signal that specifies the absolute magnitude of the reference signal. This range signal is encoded upon the reference signal.

The normalized signals at the output of amplifier 20 are fed via lead 21 through a demultiplexer or decoding apparatus comprising a plurality of switches formed by transistors 140, 142, 144, and 146 which handle the information signals $f_1$, $f_2$, $f_3$ and $f_4$ and additional switches formed by transistors 148, 149 for providing two reference signals. The information signals are provided at the output of the demultiplexer on terminals 150, 152, 154, 156 and the two reference signals of variable width are provided at demultiplexer output terminals 158 and 160. The demultiplexer transistors each has its gate electrode connected to be driven in synchronism with the corresponding switches of the multiplexer and accordingly are connected by lines (not shown) to the same output terminals of the multivibrators indicated by the reference characters adjacent the gating electrodes of the transistors, that is switch 146 and its gate electrode connected to the same output of $MV_6$ that is connected to the gate electrode of transistor 50 of the multiplexer, for example. It will be noted, for reasons previously discussed, that the switch 32 which couples the output of automatic gain control amplifier to the rectifier and peak detector, has its gate electrode connected to second output terminals of $MV_1$ and $MV_2$ in order to cause switch 32 to be operated in opposite phase with respect to switches 41, 42 and switches 148, 149. As is well known, the two output terminals of a multivibrator are, at any given time, of mutually opposite polarity, one is high whenever the other is low and vice versa. It will be readily seen that whenever the switches 41 and 42 are closed to admit the reference level signal through the circuitry of the gain control amplifier, the switch 32 is open to prevent these reference level signals from passing through the rectifier to the peak detector. Concomitantly the reference level signal is to be passed through demultiplexer switches 148 and 149 which accordingly are coupled to those terminals of $MV_1$ and $MV_2$ respectively which are in phase with the terminals coupled to the switches 41 and 42. Since the reference level signal must exist for the periods of both $MV_1$ and $MV_2$, it will be seen that the like phased outputs of these multivibrators are respectively connected to the gate electrodes of transistor switches 41 and 42 and the opposite phase outputs of these multivibrator stages are both connected to the gate electrode of switch 32 whereby these switches 41, 42 and 32 are operated in the sense indicated for the periods of both of the first two multivibrator stages.

Figure 4:
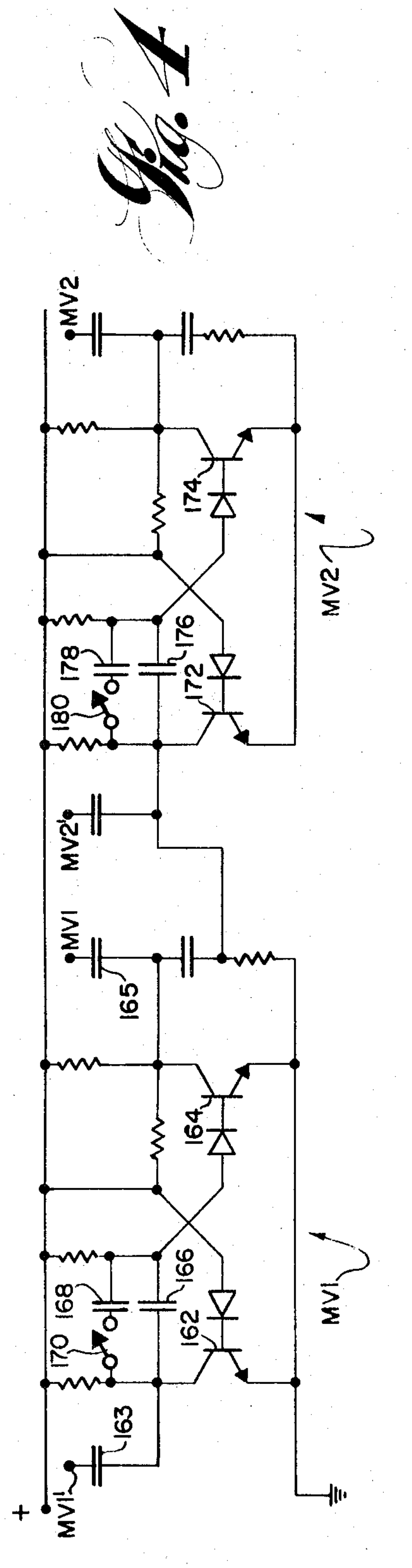
FIG. 4 illustrates a pair of stages of the demultiplexer driver.

Typical monostable multivibrator stages are illustrated in FIG. 4. Multivibrator $MV_1$ comprises a pair of transistors 162, 164 having cross-coupled base to collector connections including diodes and capacitors as illustrated and including a primary timing capacitor 166 and a variable timing control in the form of a secondary capacitor 168 and switch 170. A first output identified as $MV_1$ is provided via a capacitor 165 at the collector of transistor 164 and the opposite phase output, identified as $MV_1'$ is provided via a capacitor 163 from the output of the collector of the transistor 162. The collector of this latter, for external triggering, may be connected to receive the recycling trigger. The next stage $MV_2$ similarly comprises a pair of transistors 172, 174 having cross-coupled base to collector circuits, primary timing capacitor 176 and a secondary timing capacitor 178 controlled by a switch 180. Outputs of this multivibrator stage are provided for a first phase at the collector of transistor 172.

Each of stages $MV_3$ through $MV_6$ are identical with the stage $MV_2$ except that the stages 3 through 6 do not need nor do not have the variable timing circuitry in the form of the additional switched timing capacitor.

As previously described additional timing capacitors are provided to change the time constants of the first and second multivibrators stages and thereby provide width coding of the reference level signals. This width coding is controlled by the range signal, the states of coils 116, 118, 120, to identify the absolute magnitude of the reference signal. For the first level of signal, that is when the voltage at point 88 is at its minimum value whereby maximum gain is desired, both secondary capacitors 168 and 178 are disabled, that is they are not in the circuit. For the next voltage level switch 180 is closed, by means to be described hereinafter, to thereby provide an increase in capacitance and increase the period of $MV_2$. For the third level of reference signal the capacitor 178 is disabled and capacitor 168 of $MV_1$ is connected in the circuit. For the fourth level, both capacitors 168 and 178 are connected. This logic is achieved as illustrated in FIG. 5 wherein for the first reference level neither capacitor is connected and switches 183, 181, 185 and 186 are all in the position illustrated. Switch 183 of FIG. 5 corresponds to switch 170 of FIG. 4 and switches 181, 185, 186 of FIG. 5 correspond to switch 180. To achieve the second reference level signal switch 181 is closed to place capacitor 178 in the circuit and thereby increase the period of $MV_2$. For the third level of reference signal, switch 183 is closed and switch 185 is opened to remove capacitor 178 from the circuit of $MV_2$ and put capacitor 168 into the circuit of multivibrator $MV_1$. For the fourth level of reference signal, switch 186 is closed to once again put capacitor 178 into the circuit of $MV_2$, switch 181 having been closed to achieve the second level and remaining closed in this condition.

Figure 3A:
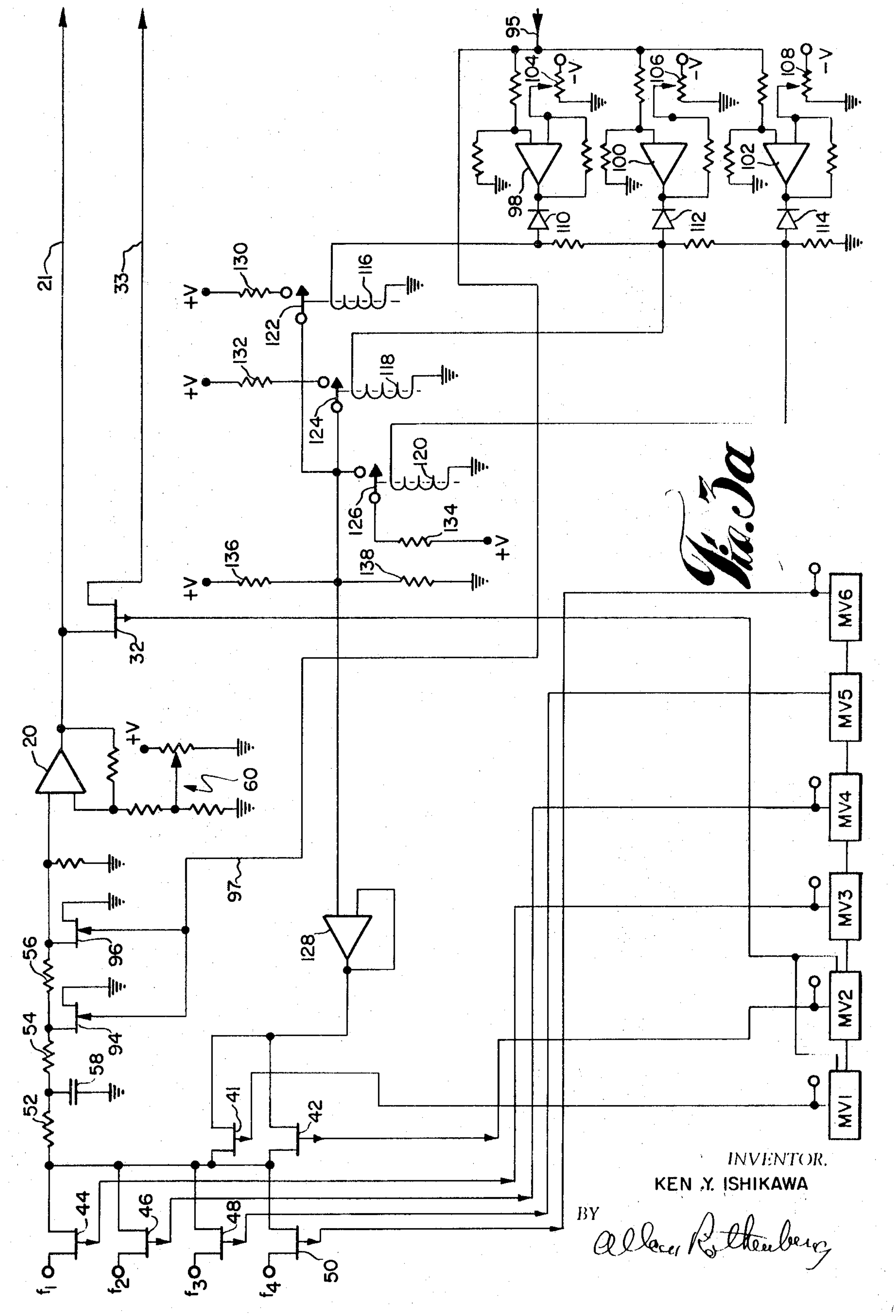
Figure 3B:
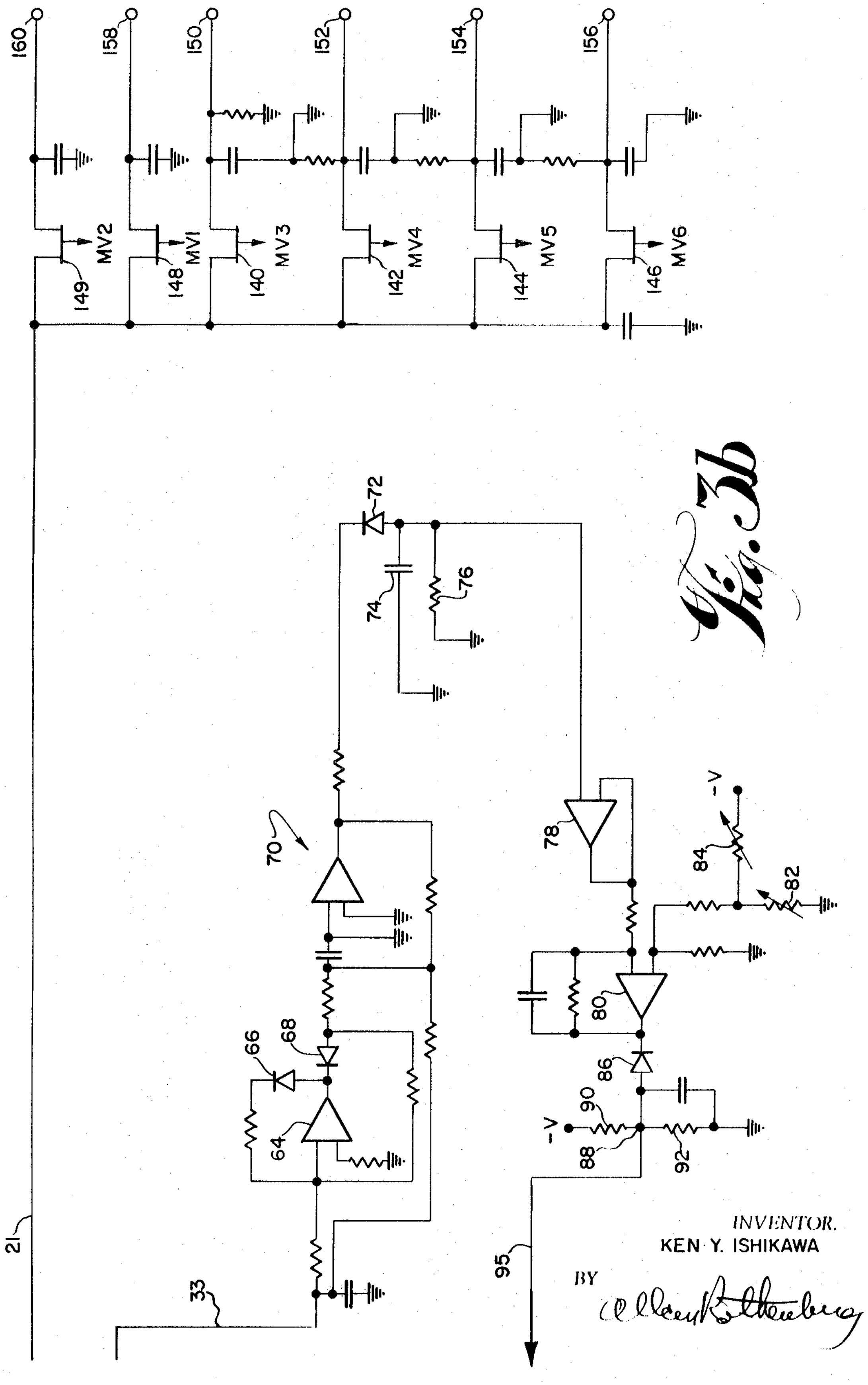

Operation of switches 181, 183, 185 and 186 is achieved by means of the relay coils 116, 118 and 120 which are energized by the outputs of the comparator amplifiers 98, 100 and 102 of the reference level generator as described in connection with FIG. 3. As illustrated in FIG. 6 it will be seen that upon energization of coil 116 also closes switch 122 of FIG. 3a but the latter switch is not illustrated since it is not needed for the purposes of this discussion. Similarly energization of coil 118 operates both switches 183 and 185, closing the former and opening the latter whereas energization of coil 120 closes switch 186. Thus the indicated logical connection of the capacitors and width coding of the reference signals is achieved With the multivibrator periods changed as indicated, the periods of operation of the demultiplexer switches 148 and 149 and multiplexer switches 41 and 42 are controlled to thereby provide at output terminals 158 and 160 first and second reference level pulses $r_1$ and $r_2$ of the combination of widths illustrated in FIGS. 2a through 2d respectively.

Although a specific arrangement for controlling the coding of the reference levels has been described which is most convenient for an application requiring a single group of information signals together with coded reference level signals at the output of the decoder, it will be readily appreciated that a variety of other arrangements for providing an indication of the particular coding of level of the reference level signal may be employed based upon the outputs of the comparator amplifiers 98, 100 and 102.

The reference level coding described above is suitable for input signals of relatively rapid amplitude variation. For use with input signals whose levels vary more slowly the systems may be arranged to transmit the width code reference signals less frequently than upon every multiplexer cycle. For example, the coded reference level signals may be presented through the systems at repetitious rates based upon selected multiples of multiplexer cycles, such as every tenth or twentieth cycle, or the like.

In an arrangement such as illustrated in the above mentioned copending patent application of C. R. Johnson and K. Y. Ishikawa for SPECTRUM ANALYZER, it is desired to record the information signals together with the reference level signals in a selected sequence. Accordingly the parallel outputs of information signals at terminals 150 and 156 of the circuit illustrated in FIG. 3 are fed to a data processing system and thence fed to a selector switching arrangement that is more particularly described in the copending application. In such an arrangement it is more convenient to provide the variable width coding of the reference signals in the selector switching arrangement. The circuit of FIG. 3 is modified as illustrated in FIG. 7 to achieve this end. As illustrated in FIG. 7 the output of the rectifier via amplifier 70 is fed not only to the peak detector 72, 74, 76 but is also fed in this arrangement directly to the common input terminals or drain electrodes of each of the switches of 140, 142, 144 and 146 of the output decoder. In this modification switch 32 is connected only to the opposite phase output electrodes $MV_1'$ of the multiplexor-demultiplexor driver. Switch 148 is provided to pass the reference signal and therefore has its gate electrode connected to the output $MV_1$ electrode of the first multivibrator stage. In this arrangement $MV_2$ and switch 42 are not employed. The reference signal passed by switch 148 is thence fed with suitable amplification (not shown) to the scanner or selector switches of the spectrum analyzer. This reference level signal from the output of transistor 148 is fed in parallel to a pair of switches of the scanner or selector switch bank (not shown), each of which will have an appropriately coded control signal applied to its gate electrode to provide for the width coding of the reference signals, as more particularly described in the copending application.

In a specific apparatus in which the described invention has been incorporated, input signals may vary over a range of 80 decibels, from a value of 1 millivolt to 10,000 millivolts. In such an arrangement for four described levels of reference signals are most convenient and these are divided into a first range of from 1 to 10 millivolts, a second range of from 10 to 100 millivolts, a third range of from 100 to 1000 millivolts, and a fourth range of 1000 to 10,000 millivolts. Thus with signals within the first range the amplification provided by the gain control is greatest and the reference level signal generated is of smallest value although it has a known level which enables identification of the absolute magnitude of the normalized input signals. For input signals in the maximum range of 1000 to 10,000 millivolts, the gain is minimum and a maximum value of known magnitude reference signal is provided to the multiplexer for identification of absolute values of the information signals.

The periods of pulse width for information signals, the timing of the multivibrators, the timing of the multiplexer and demultiplexer and the number of inputs are all described for a preferred embodiment but, as will be readily appreciated, may be varied for a particular situation. Pulse widths chosen for the disclosed embodiment are based in part upon use with a display in the form of a recorder capable of recording at about 5 millimeters per second. This speed requires a minimum of 0.2-second pulse width for each pulse displayed for appropriate visual resolution. Preferably double width pulses are employed for the calibration pulses. Thus these widths of 0.2 seconds and increased or double width scale indication would be most appropriately employed at the output of the spectrum analyzer system described in copending application or after the data has been appropriately processed. For other applications where visual resolution or other requirements do not dictate a pulse of such great width, the output pulses may be on the order of the 2 millisecond and 4 millisecond information and reference signal durations described above.

It will be seen that there has been described an improved data normalizing system capable of operating with increased precision on a large number of input signals and employing but a single channel of amplification and normalization together with appropriately controlled multiplexer and demultiplexer. The described arrangement eliminates tracking or matching of gains of a variety of gain control amplifiers, provides increased precision and is readily adaptable for a variety of application. In some situation where only relative amplitude of the information signals are required or where other external information is available as to the absolute magnitudes of normalized signals, it will be readily appreciated that the circuitry of the reference level generator and the coded reference level pulses may be eliminated.

What is claimed is:

1. A data handling system comprising:
- a gain control circuit adapted to receive a train of pulses;
- detector means for sensing the maximum pulse of successive groups of pulses occurring at the output of the gain control circuit during a chronologically progressive interval of selected duration;
- means for varying the gain of the gain control circuit in accordance with the magnitude of detected maximum pulse;
- multiplexor for multiplexor sampling each of a plurality of input signals to provide said train of pulses to the gain control circuit;
- means for generating a reference signal representative of a known magnitude;
- means for feeding the reference signal to the multiplexer to be sampled in sequence with the input signals; and
- means for causing each pulse of said train that represents the reference signal to bypass the detector means.

2. The system of claim 1 wherein said reference signal generating means includes means responsive to the detector means for causing the reference signal to have an absolute magnitude representing a range of peak pulses.

3. The system of claim 2 including means responsive to the magnitude of a detected maximum pulse for coding the pulses representing reference signals to indicate absolute value thereof.

4. The system of claim 3 wherein said coding means includes means for controlling the multiplexer to vary the width of pulses representing the reference signal.

5. A data normalizer comprising:
- a multiplexer having a plurality of input switches and an output;
- a gain control amplifier having an input from the multiplexer output and having an output;
- a controllably variable shunt connected across the amplifier input;
- a rectifier having an input and an output;
- a bypass switch interconnecting the output of the gain control amplifier and the input of the rectifier;
- a peak detector having an input connected to the output of the rectifier and having an output;
- a reference source;
- an error comparator having a first input from the reference source and having a second input from the output of the peak detector, and having an output connected to control the shunt;
- a reference level amplifier connected to the output of the error comparator to provide an output of a first magnitude as an input to one of said multiplexer switches;
- a demultiplexer comprising a plurality of switches having an input from the gain control amplifier and having a plurality of outputs; and
- a sequential driver for synchronously operating and recycling the multiplexer and demultiplexer switches.

6. The data normalizer of claim 5 including:
- a plurality of second reference sources;
- a plurality of reference level comparators each having an output connected to the input of the reference level amplifier, having a first input connected to different ones of said second reference sources and having a second input from said error comparator whereby when said reference level comparators provide an output to said reference level amplifier, the output of the latter is of a different magnitude;
- said demultiplexer including first and second additional demultiplexer switches having inputs connected to the output of the gain control amplifier;
- said sequential driver including a plurality of driving stages of which a first unique stage is connected to drive said bypass switch in opposite phase relation to said one multiplexer switch and a first one of the additional switches of the demultiplexer;
- said sequential driver including a second unique stage to drive the second of the additional switches of the demultiplexer; and
- means responsive to the outputs of said reference level comparators for uniquely controlling the duration of the output of said unique driver stages whereby the output of the demultiplexer comprises a series of pulses representing the inputs to the multiplexer together with pulses having a magnitude representative of a selected reference level and having duration indicating such reference level.

7. A data handling system comprising:
- a plurality of signal sources, each providing a source signal of varying amplitude;
- a variable gain controllable amplifier;
- a peak detector coupled to the output of said amplifier for detecting the amplitude of the output thereof and producing a peak signal indicative of the output amplitude of the amplifier;
- means for providing a reference signal with a fixed amplitude and for comparing the reference and peak signals to produce a comparative signal whose amplitude is indicative of the difference thereof;
- said amplifier having means responsive to the amplitude of comparative signal for controlling the gain thereof;
- a recycling input multiplexer for coupling, in turn, each source signal and said comparative signal to said amplifier, and
- means also responsive to the amplitude of the comparative signal for varying the time that the comparative signal is fed by said multiplexer to said amplifier so that the time-width of the amplified comparative signal is indicative of the degree of amplification of the following amplified source signals.

8. The system of claim 7 wherein:
- switch means are provided in response to said multiplexer to decouple the output of said amplifier from said peak detector when the multiplexer is coupling the comparative signal to said amplifier.

9. A data handling system comprising:
- plurality of signal sources, each providing a source signal of varying amplitude;

a variable gain controllable amplifier;

a peak detector coupled to the output of said amplifier for detecting the amplitude of the output thereof and producing a peak signal indicative of the output amplitude of the amplifier;

means for providing a reference signal with a fixed amplitude and for comparing the reference and peak signals to produce a comparative signal whose amplitude is indicative of the difference thereof;

said amplifier having means responsive to the amplitude of comparative signal for controlling the gain thereof;

a recycling input multiplexor for coupling, in turn, each source signal and then coupling said comparative signal at least twice to said amplifier to produce pulses;

means responsive to the amplitude of the comparative signal for varying the time duration between one of two values whenever the comparative signal is fed to said amplifier so that the time widths of each pulse digitally represents the degree of amplification of the following amplified source signal.

10. The system of claim 7 wherein:

switch means are provided in response to said multiplexer to decouple the output of said amplifier from said peak detector when the multiplexer is coupling the comparative signal to said amplifier.

* * * * *